Sept. 5, 1933.  H. E. LA BOUR  1,925,392
VALVE
Filed March 30, 1931   2 Sheets-Sheet 2

Inventor
Harry E. La Bour
By Mour, Jackson, Bortner-Deuner
Attys.

Patented Sept. 5, 1933

1,925,392

UNITED STATES PATENT OFFICE 1,925,392

VALVE

Harry E. La Bour, Elkhart, Ind.

Application March 30, 1931. Serial No. 526,196

16 Claims. (Cl. 251—50)

My invention relates to valves in general, and particularly to valves intended for handling corrosive fluids. However, certain aspects of my disclosure may also be advantageously used in valves applicable in other fields, and I therefore wish to limit the invention neither strictly to the structure which I am about to disclose nor to its specific application.

The invention will be better understood when the antecedents are known from which it has emerged. I shall therefore briefly review the background of the invention before entering a discussion thereof.

In valves of this type, i. e., valves used for corrosive fluids, it is frequently necessary to renew the plug member and the seat member for, although the parts are made of corrosion resisting metals, they are subject to wear and action by impurities contained in the fluids being handled. These parts are the most vital because they must at all times be in good mechanical condition in order to secure the reliable operation of the mechanism.

In my Patent No. 1,679,907, issued August 7, 1928, I have shown a valve in which I have provided renewable plug and seat members and, in order to make the work of inspecting, renewing and repairing these parts as convenient as possible, I have provided in this structure a lateral opening in the valve body adjacent the location of both these parts, so that by removing a cover plate I can reach in through the opening and have access to both the plug and the seat members for inspection, repair, or replacement. This construction permits thus access to these parts without removing the valve from the pipe line in which it is connected.

As shown in the above mentioned patent, I have provided a seat member which is held in place by an external screw member which, therefore, is not exposed to the action of the liquid being handled. This construction fastens the valve seat member down so that it will be tight on its seat and the valve body or casing. The details of this construction may be had from the patent referred to. However, for the sake of convenient description it may be pointed out that I have provided fingers on the inside of the cover, which fingers extend into contact with the seat. Preferably two fingers are employed on the inside of the cover and these fingers reach into the valve body and perform the function of clamping the valve seat down in its position. The cover is fastened to the body by means of a clamp or yoke having a screw which presses against the cover at an angle to the plane of the cover so as to provide a component of pressure in the direction for holding the seat member tightly in place. The cover may be pivoted to the casing if desired and by swinging about its pivot may provide the necessary pressures for holding the cover and the seat member in position.

Another feature disclosed in the previously cited patent is concerned with an improvement in the gland and follower construction. It is difficult in valves of this kind to keep the gland tight. As a result, the corrosive fluid tends to leak along the valve stem and may corrode the gland follower. While it would be possible to make these parts also of a noncorrodible material, the cost is a deterrent. The structure disclosed in the above mentioned patent shows a gland and follower which backs against a yoke. The structure is such, that while it may be readily adjustable, it is also a separate assembly which may be removed and replaced with little cost. The gland provides a drain opening for bleeding away any leakage of corrosive liquid in such a way as to keep such leakage away from the parts which are made of noncorrodible materials.

There are several other features disclosed in the above mentioned patent, such for example as an improved hand wheel and operating mechanism which permits of ready disassembly without danger of binding the valve stem or coming loose therefrom, and which provides a lubricant container for lubricating the operating threads. The valve plug and its stem are moved to and from the seat without requiring rotation.

In the present invention, I have provided a valve in which I have incorporated numerous novel features and improvements over the structure disclosed in my above mentioned patent. I shall now describe these novel features, first in general terms and later on in detail.

To be of maximum value, a valve of this type must be more universal in application than those heretofore offered. The valve disclosed in the present case has been designed to meet this universal requirement in respect to its structure as well as in respect to the materials that have been employed in the valve, adapting the same to withstand the corrosive and erosive effect of a maximum range of chemical applications.

Certain features of the present invention are generally similar to corresponding features of the structure disclosed in the patent previously referred to. For example, the valve is such as to deflect the liquid as little as possible from a straight flow. The body proper is cast in a single piece, with flanges at either end. If desired, the valve body may be tapped for threaded connection. A large access opening is provided on the top of the valve body. A single screw clamp holds the cover in place, and from the inside of this cover project two fingers which bear on the seat of the valve so that removal of the cover not only makes the seat members accessible but, at the same time, actually releases the seat so that it can be easily lifted out.

Other features exhibit improvements as is pointed out below:

A special, easily removable ring type seat is used in conjunction with a taper or plug type valve, producing an approximate line contact. The structure is designed with a view to produce a tight seat of the metal-to-metal seat members and also to prevent the likelihood of accumulating scale or foreign material which might interfere with proper closure.

The plug portion of the valve is loosely supported on the valve stem and is self-aligning. Both the plug and the ring seat members can be easily and quickly removed or replaced through the access opening, without disturbing the position or setting of the valve in the pipe line.

An auxiliary seat member is provided on top of the valve plug which, when the plug is raised to its maximum limit, makes contact with a corresponding seat surface on the end of a novel gland sleeve. This takes the pressure off the packing gland and permits reliable replacement of the packing while the valve is in service, under pressure, and wide open. This auxiliary seat is also used for holding the valve plug in assembly with the valve stem.

The valve stem is of the rising type. Although it is not fixed in place, it is non-turning. The valve stem is of heavy construction and there are no threads on it, so that all possible danger or trouble from creeping acid is eliminated. The valve stem is suspended in the operating mechanism which lies inside the hub below the hand wheel, and entirely out of possible contact with the liquid being handled.

All of the operating threads are covered and protected, and are continuously lubricated through an oil reservoir. The threads are of large diameter, which insures easy operation as well as close regulation.

A stuffing box of ample size is provided, made specially easy of access for the use of the removable gland follower. This stuffing box will be referred to as gland bushing, guide member for the stem, or as gland sleeve, according to the function which it performs and which will be described.

This gland bushing is flanged and held on the valve body by means of a nut which also fastens the yoke forming the hub or lubricant container. This structure eliminates certain screws or bolts and simplifies assembly.

The gland follower is removable and may be operated from the outside.

The construction may be incorporated in check valves as well as in the throttling type of valve. The same valve bodies may be used in either case. The same feature of the access opening with its easily removable cover plate having inwardly projecting fingers to hold the valve seat in position is found in the check valve. The plug member may be hinged to the seat in case of a check valve and, consequently, removal of the cover plate will permit removal or replacement of both seat and plug as a single unit.

The valve may be used for horizontal or vertical mounting as desired which is another example of the universality of application of my invention.

Now, in order to teach those skilled in the art how to construct and operate my invention, I shall describe the same in connection with the accompanying drawings showing specific embodiments of the same.

In the accompanying drawings:

Figure 4 is a detail, namely, the cover plate for the access opening which is provided with the fingers for clamping the valve seat in place;

Figure 5 is another detail, illustrating the cover clamp or yoke for holding the cover in place; and Figure 6 is a cross sectional side view through another embodiment of the invention, showing a check valve.

Like numerals indicate identical parts throughout the several views shown in the drawings, Figures 1 to 5, inclusive, while primed reference numerals have been used in Figure 6 to indicate parts denoted by unprimed numerals in the other figures.

Figure 1:
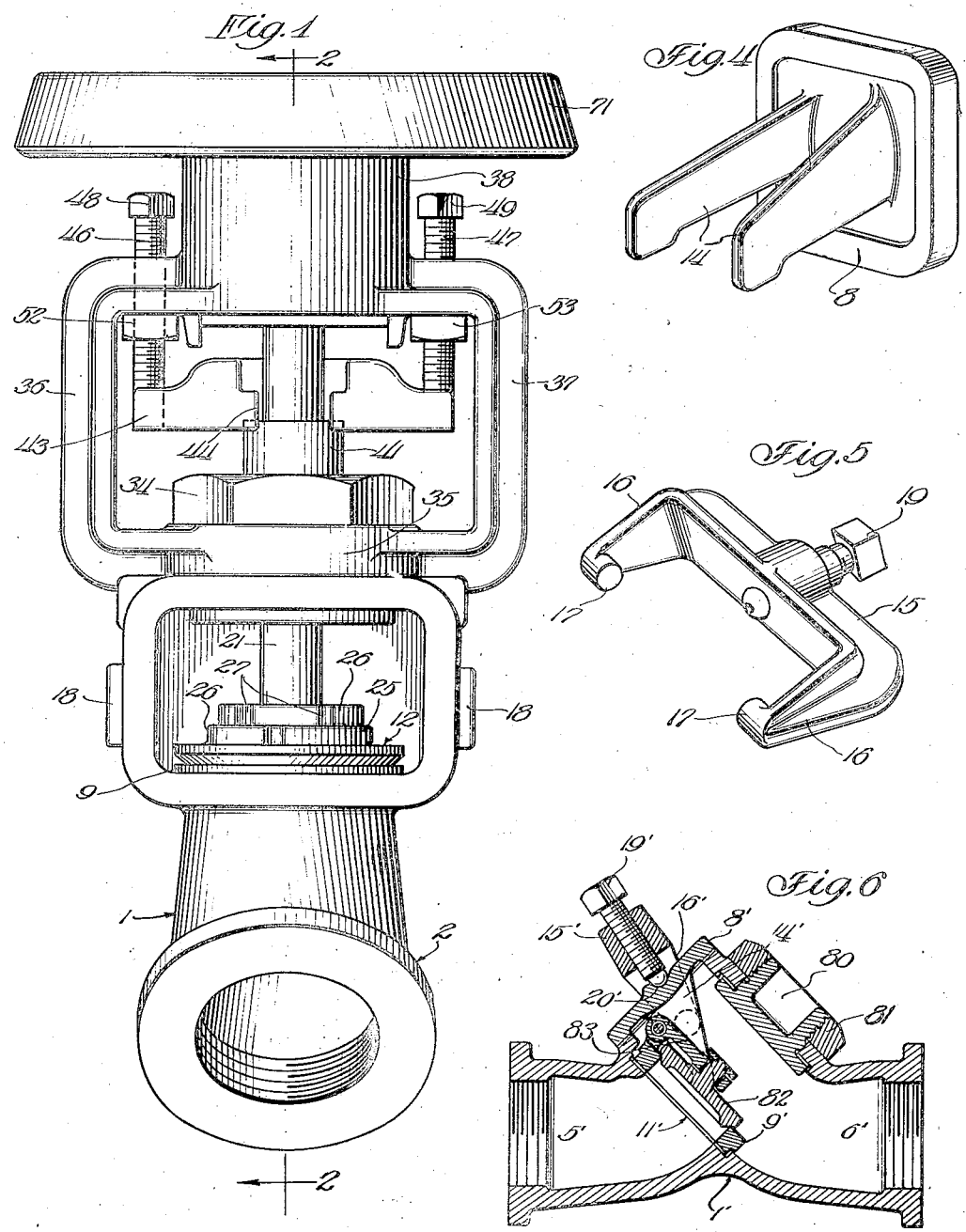
Figure 1 is an elevation of the invention as embodied in a throttling valve.
Figure 2:
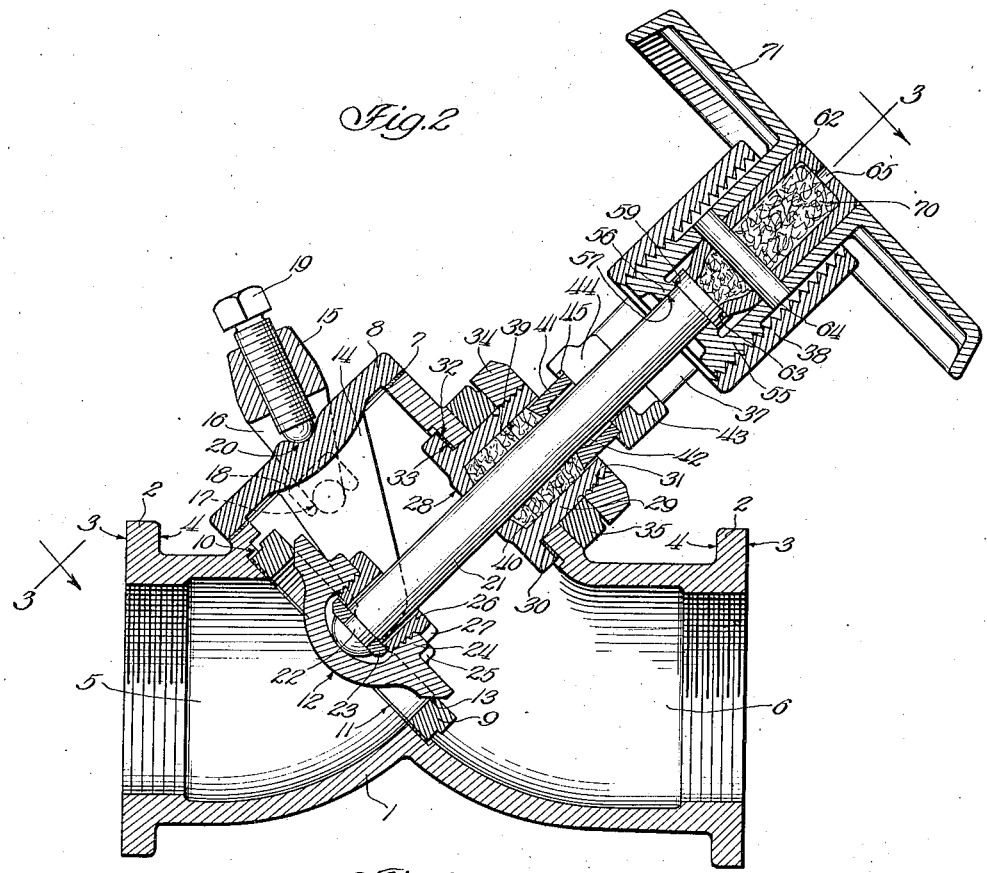
Figure 2 is an elevation mostly in section as seen from the line 2—2 of Figure 1, looking in the direction indicated by the arrows.
Figure 3:
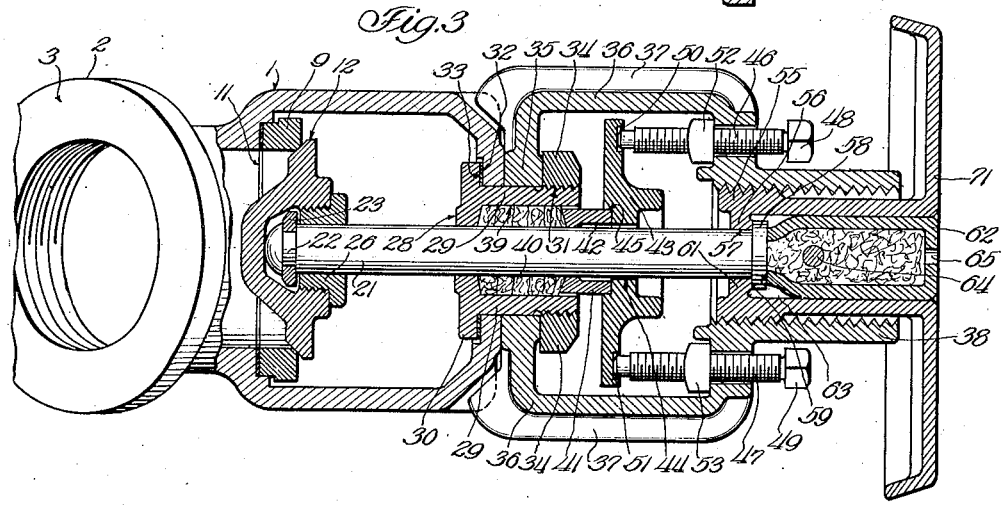
Figure 3 is a plan elevation of the valve mechanism similar to the elevation shown in Figure 1, mostly in cross section, illustrating the valve mechanism as seen from line 3—3 of Figure 2, looking in the direction of the arrows.

Referring now particularly to the drawings, Figures 1 to 5, inclusive, the main casing or body of the valve is designated by the reference numeral 1. The casing is of cast construction and is composed of a comparatively strong noncorrodible alloy of which illium is an example. The casing 1 is terminated on both ends by flanges designated by the numeral 2. The outer faces 3, particularly designated in the Figure 2, are adapted to engage gaskets or the corresponding flanges on the ends of the pipe line to be connected by this valve. Split flanges which I have not shown in the drawings may be used for surrounding the casing and, by means of bolts drawn through holes in the split flanges and in like cooperating flanges on the pipe, may be made to bear heavily upon the inside faces 4 of the flanges 2, so as to form a leak proof joint. If such split flanges are used for connecting the valve on either side with the corresponding pipes, the flanges on the outside of the valve body meeting with the flanges of the pipes with suitable gaskets interposed, it will be apparent that none of the corrosive fluids circulating through the valve and through the pipe line can contact the split flanges so that they can be made of ordinary materals such as malleable or cast iron. I have also shown threads in both ends of the valve body in order to indicate that the same may be provided for threaded connection to the pipes if desired.

As many be seen, particularly from Figure 2, the valve casing or body 1 includes two chambers 5 and 6, each of which has an end opening directly into the adjoining pipe line. The remaining end of the chamber 6 is slanted at an angle from the pipe line and is adapted to cooperate with a gasket 7 and a cap or cover 8, which is also made of a material proof against corrosion.

This cap and gasket effect a leak proof closure for this end of the chamber 6. The chamber 5 communicates with chamber 6 through a port and valve structure which I shall describe next.

The valve seat proper is composed of a novel structure including the valve ring 9, preferably made of illium or other suitable metal. The smaller part of the ring 9 is fitted into a bore 10 and abuts a gasket 11. There is no tight fit between the valve ring 9 and the bore 10 in the valve body 1. The valve ring 9 fits rather loosely into the bore and cooperates with the valve plug 12 so that the latter is self aligning, producing an approximate line contact. It will be noted that the valve seat 9, not being threaded into place, is readily removable. It will also be noted that the valve ring 9 is above the opening which is normally closed by the cover 8 as is clearly illustrated in Figure 2. By removing the cover and inserting a suitable instrument under the flange of the valve ring 9, with the valve plug 12 in raised position, the valve ring can be raised and removed with facility. The actual valve seat 13 on the valve ring 9 may be of the tapered type and very narrow so as to permit of a certain amount of cleaning action in order to preclude, as much as possible, the fouling of the valve.

The valve ring 9 is held in place by means of a pair of arms or fingers such as indicated by the reference numeral 14 which depend from the inside of the cover 8. This cover may be particularly seen in Figure 4. The arms 14 reach into the valve body when the cover 8 is placed on the access opening as is shown in Figure 2, and the ends of the arms 14 engage the surface of the valve ring 9, holding the valve ring in place against the gasket 11. The cover 8 is held in place on the valve body by means of a yoke which is particularly illustrated in Figure 5. This yoke 15 has two arms, 16, 16 which fit over the end of the chamber 6 of the valve body. Each arm is provided with a lug 17 and these lugs cooperate with sockets 18 which are integral with the cast body of the valve and located on each side of the slanting portion of the chamber 6. A cap screw 19 is provided for holding the yoke on the valve and when this cap screw 19 is tightened, it will bear against the socket 20 on the cover 8 and will clamp the cover tightly against the gasket 7 and, at the same time, the valve seat 9 against the gasket 11. It will be noted that the sockets or bearings 18 on the valve body are so located as to cause the cap screw 19 to bear down on the cover 8 at such an angle as to have a component imparting pressure thereto to hold it in leakproof contact with the end of the chamber 6 of the valve body. It will also be noted that the axes of the cap screw 19 and the arms or fingers 14—14 on the inside of the cover 8 are substantially parallel and that the arms 14 bear upon the valve ring seat 9 at such an angle as to have a component imparting sufficient pressure thereto to hold it in place against the gasket 11.

The valve plug 12 is made of noncorrodible material. It is loosely supported on the valve stem 21 which is made of the same material. The stem 21, at its end is provided with an annular notch or recess 22. Fitted into this annular recess is the washer 23. The mounting side of the valve plug 12 is provided with a threaded portion 24 which project slightly from the surface of the plug body and is provided with a number of peripherally disposed notches 25 as particularly seen in Figure 1, which notches serve the purpose of inserting a suitable tool for assembling the valve plug with the stem 21. An auxiliary seat member 26, provided with a tapering threaded portion and a flange, is adapted to be attached to the valve plug 12 by threading the tapering end into the threaded portion 24 of the valve plug 12 as is particularly shown in Figures 2 and 3. The flange of the auxiliary seat member 26 is also provided with a number of notches 27 for facilitating the assembly of the auxiliary seat member with the valve plug 12 on the stem 21. It will thus be seen that the valve plug 12 is mounted on the stem 21 in relatively loose engagement therewith. The valve plug 12, the auxiliary seat member 26, the washer 23 and also the stem 21, are all made of non-corrodible material.

The recess 22 on the stem 21 may either be round or it may be polygonal with the washer 23 fitting into the recess as shown. Now, when a pull is exerted on the stem 21 it will be noted that the washer 23 will engage the surface on the tapering threaded end of the auxiliary seat member assembled with the valve plug and will thus tend to pull the valve plug 12 out of engagement with the valve seat 9. However, upon moving the stem 21 in the contrary direction, when it is intended to close the valve, the rounded end of the stem 21 will press against the hollow central portion of the valve plug 12 and will thereby press the valve plug into engagement with the valve ring 9. The structure is easily assembled and provides an excellent self-aligning valve.

The structure of the valve members including the valve plug 12 and the auxiliary seat member 26 and the manner in which these members are assembled on the stem 21 is novel when compared with the manner of constructing the valve plug in prior inventions. An additional feature of novelty resides in the function of the auxiliary plug seat member 26, which I will now describe.

It is desirable to construct the valve so that the same may be repacked under pressure. That is to say, it is desirable that the structure be so as to permit removal of the packing from the stuffing box and insertion of new packing without removing the valve from the pipe line and without interfering with the operation of the valve. If this were attempted in an ordinary construction, provided such construction would permit repacking from a purely mechanical point of view, the result would be a creeping out of the fluid due to the pressure in the valve, along the passages through which the stem projects into the valve, thereby not only soiling the valve but making repacking actually impossible.

With the structure which I have provided, that is to say with the auxiliary seat member 26, such repacking under pressure is made possible regardless of the nature of the fluid in the valve and regardless of the pressure. All that is necessary is to raise the valve plug to its maximum limit by raising the valve stem 21 so that contact is made between the auxiliary seat member 26 and a corresponding seat surface 28 on the end of the gland sleeve 29. The contact between the auxiliary seat member 26 and the seat surface 28 on the gland sleeve will take the pressure off the packing gland and will thus permit replacement of the packing while the valve is in service, under pressure, and wide open.

The stem 21 is housed in the guide member or gland sleeve 29. It will be recalled that this member 29 is referred to a guide member, gland sleeve, or as stuffing box, according to the functions which it performs in the mechanism. I call attention to the terminology in order to obviate confusion. This gland sleeve 29 is made of illium or of another suitable non-corrodible material. The gland sleeve 29 has a flange 30 and a threaded portion 31. It is inserted into the valve body with the stem 21 projecting through the central opening in its flanged bottom so that the flange 30 faces the inside surface 32 in the wall of the valve body. A gasket 33 is interposed between the flange 30 and the surface 32 in order to make a tight fit between the gland sleeve 29 and the valve body. The yoke nut 34 which is attached to the threaded end 31 on the gland sleeve 29 holds the gland sleeve in place in assembly with the valve body and also holds the yoke 35 in firm assembly with the valve body, the yoke 35 being interposed between the outer surface of the valve body and the yoke nut 34 as shown. The gland sleeve 29 is of novel construction, and the manner in which it is mounted is also novel. The entire assembly is simplified due to the fact that I use only a single nut for holding the gland sleeve and also the yoke 35 in position on the valve body.

The yoke 35 comprises two arms 36 and 37 which extend from its inner portion and are formed integral with the hub 38. This structure will be described more particularly later on.

The above described attachment of the gland sleeve or guide member 29 to the valve casing 1 is made so that the gland sleeve enters the slanting portion of the chamber 6 and is substantially in axial alignment with the valve seat 9. It will be observed that the gland sleeve 29 which also serves as a guide member for the stem 21 is removably attached to the valve housing without resorting to a threaded connection. A thread always represents some danger in connection with valves of this type due to the corrosive and erosive influence of the liquid or fluid circulating through the valve. The gland sleeve 29 is made a separate member, and is attached to the valve housing in the manner explained above, in preference of being made integral with the housing, in order to provide a way for machining the casing 1 to receive the ring seat 9. Once in place, the gland sleeve 29 need not be removed and may for all intents and purposes be treated as integral with the casing 1. Its attachment is extremely simple and its replacement, should such replacement be necessary can be easily effected. In case of a threaded connection, the danger is always present that the thread will bind due to the corrosive effect of the fluid, making replacement or removal for any purpose extremely difficult and under certain conditions even impossible.

The gland sleeve or guide member 29 is bored out at 39 to receive the usual gland packing 40. The gland 41 may be of the construction shown. It may be made of noncorrodible material to fit loosely within the bore 39 and to bear upon the packing 40. This gland has the usual bore which fits about the stem of the valve, but is tubularly enlarged in its upper portion, as indicated by numeral 42. If desired, the gland shown in the Patent No. 1,679,907, referred to previously, may be substituted for the gland 41 which I have shown in the drawings.

Since the remaining parts of the valve are supported directly or indirectly by the hub or housing 38, it will be described next.

The hollow cylindrical housing 38 is rigidly supported upon the arms or brackets 36 and 37, which in turn are fastened by means of the yoke nut 34 on the valve housing as was already described.

This attachment of the hub or housing 38 to the valve body, by means of the yoke and nut 34, is to be considered a further novel feature of the present invention. It simplifies the casting of the valve body and eliminates separate screws for the attachment of the yoke, thereby eliminating the most annoying parts in such a structure. The mounting is made simple, reducing the cost of fabrication as well as assembly.

A gland follower 43 is provided in order to force the gland 41 against the packing 40 in the customary manner. The follower 43 is provided with a slot 44 of sufficient width to permit its being slipped off from and on the stem 21 laterally to the stem. A shallow counter bore 45 engages the end of the gland 41. Cap screws 46 and 47 having heads 48 and 49 pass through holes in the arms 36 and 37 which extend from the housing 38 and engage sockets 50 and 51 in the gland follower 43 as is particularly shown in the Figure 3. As will be seen, particularly from this Figure 3, the screws 46 and 47 pass through the holes in the arms 36 and 37. Nuts 52 and 53 engage the screws. These nuts are of non-circular configuration and are positioned in sockets at the place where the arms 36 and 37 branch off from the housing 38. When it is desired to force the gland follower 43 against the gland 41, all that is necessary will be the tightening of the screws 46 and 47 which may be conveniently made from the outside by means of a wrench engaging the heads 48 and 49, respectively, of the screws 46 and 47. These screws will turn in the nuts 52 and 53 while the latter are held against turning in the sockets, whereby the screws can be forced up and down relieving the gland follower 43 or tightening the same against the gland 41 as desired.

The above described structure and the assembly of the gland follower 43 in cooperation with other parts, as well as the manner in which the gland follower may be forced against the gland 41 by means of the bolts 46 and 47 is another novel feature in the present invention. The bolts 46 and 47 project to the outside of the mechanism and thus afford means for convenient operation when tightening of the packing is to be effected. In the previously mentioned structure, which is disclosed in the patent which I have cited elsewhere, I have shown a structure wherein the heads of bolts engage corresponding sockets in the housing and whereby the tightening of the packing by means of the gland follower, that is to say, whereby the operation of the gland follower is achieved by means of nuts operable within the arms such as 36 and 37. Although this structure is quite convenient, it will readily be seen that the present manner of operating the gland follower is simpler and represents an improvement over the previous construction.

The cylindrical housing or casing 38 is threaded internally to receive the hub 55 of a hollow threaded operating member or hand wheel 71. This operating member 55 has a closed end 56 which is provided with a bore 57 to receive the valve stem 21. The stem is provided with a head 58 which rides upon the machined face 59 of the slightly raised boss on the bottom 61. The opposite end of the operating member 55 is closed by a hollow cylindrical plug 62 having a tapering inner end terminating in a machined face 63 which engages the top face of the head of the operating stem. The plug 62 is retained within the operating member 55 by means of a transverse pin 64. The plug 62 is filled with cotton waste, oil wicking, or similar material 70 which is absorbent in order that the oil which is introduced into the interior through a convenient opening 65 will be retained therein and fed through the wearing surfaces to lubricate the operating parts and to seep through the adjacent surfaces to lubricate the thread. Suitable holes may be provided in the operating member 55 in order to facilitate the lubrication of the parts in the hollow casing 38. It is also possible to provide a screw driver slot in the head 58 of the stem 21 to facilitate the passage of oil from the oil packing 70 to the operating parts. Other means may be provided for permitting the escape of the lubricant from the hollow plug 62. Such other means may be represented by polygonal sides formed on the head of the stem 21, and oil holes or slots through it or through the plug 62. The flange 71 on the hand wheel is provided for easy grasp and, also not shown, may be fluted, knurled, or in some way roughened to provide for a firm grip. The operation of the above described valve is as follows:

Turning the operating member 55 in a counter-clockwise direction will thread it upwards. The head 58 of the stem 21 will be pulled along and thus slide the stem through the gland to open the valve. The valve is closed by turning the operating member in the opposite direction, causing the plug 62 to bear against the top of the head 58 of the stem and to force the stem downward through the gland and causing the plug 12 to contact the ring seat 9. The plug and the stem are not required to rotate. It is not desirable in the normal operation of a valve of this general type to rotate the valve in contact with the seat because of the tendency to cut the same or to imbed impurities. It will be noted that when the valve is in its wide open position it offers no more obstruction to the passage of the fluid than that offered by the pipe line itself.

Should it be desired to "grind in" the plug and seat without removing the pressure from the line, all that is necessary is to screw the operating member out sufficiently to permit removal of the pin 64. The plug 62 can then be removed, and the operating member turned down sufficiently to permit the valve plug and seat coming into contact, after which a suitable tool may be used to turn the stem and valve plug against the seat which, being very narrow, should soon become suitably fitted to the plug. For this purpose, not only should the recess 22 be polygonal but also the washer 23 and the recess in the valve plug receiving the washer. The latter may be a closed washer or an open or U washer. The head 58 of the stem might be hexagonal or non-circular having a socket wrench for turning the same. This operation of grinding can be performed without disturbing the gland or the packing. The hollow plug 62 can be easily reassembled with the operating member 55 to place the apparatus in normal operating condition.

The removal of the ring seat can be effected by opening the valve wide, draining the line, relieving the screw 19, removing the yoke 15 and then removing the cover or cap 8. The valve seat can then be taken out of its place and cleaned, repaired or replaced. The gasket 11 may also be replaced if worn out or damaged. It is apparent that the removal of the cover 8 opens the chamber 6 for inspection and cleaning.

The valve plug 12 can be removed from the assembly on the stem 21 by simply employing suitable tools for engaging the notches such as 25 and 27 on the valve plug 12 and on the auxiliary seat member 26, respectively. These two members are then separated by unscrewing the auxiliary seat member from engagement with the valve plug 12. The latter can then be easily removed, and if the removal of the former is desired, the washer 23 will have to be removed from engagement in the groove or notch 22 on the lower end of the stem 21. Attention is called to the fact that the flange on the auxiliary seat member 26 overlies the threaded opening in the valve plug 12. The threaded opening is by this simple means completely closed so that the thread between the valve plug 12 and the auxiliary seat member 26 as well as the washer 23 are completely withdrawn from the corrosive and erosive influence of the liquid or fluid which flows through the valve.

The manner in which the valve may be repacked under pressure by opening the same to the extreme so that the auxiliary seat member 26 contacts with the surface 28 on the gland sleeve 29 has been described previously. Pressure is taken off the gland packing by the engagement of the auxiliary seat member 26 with the seat 28 so that repacking can be accomplished under pressure.

Attention is directed to the fact that essential repairs or replacements can be effected without uncoupling the valve from the line and that the provision of oiling safeguards reliable operation without necessitating frequent attention. The construction of this valve renders the parts which are not resistant to corrosion proof against unintentional contact with the corrosive fluids to a greater degree than prior constructions.

Inasmuch as noncorrodible alloys or metals, such as illium or other suitable metals, which possess sufficient strength to function as part of such valve without being reinforced by other metals are rare and consequently expensive, it is desirable to employ a minimum number of parts made up of this material. The present invention is the result in part of further efforts to minimize the number of parts which must be noncorrodible, and to assemble those parts in such manner as to preserve their function under any circumstances and conditions of operation. The only parts which must necessarily be made of illium or equivalent metal are the main casing 1, the cover 8, the valve seat 9, the valve plug 12, the auxiliary seat member 26, the washer 23, the stem 21, and the gland 41. The gland follower 43 may be also made of acid resisting material, but it is cheap and can be easily removed so that it involves little expense to replace it when corroded.

Taking into consideration the advantages of the novel features of the present invention, namely, the novel seat members and their assembly, the provision of an auxiliary seat member for repacking under pressure without producing any leakage whatsoever, the self-aligning feature between the valve plug and the valve seat, the elimination of certain parts through the novel construction of the gland sleeve, the mounting thereof which also holds the yoke and the housing 38 in operative assembly with the main body of the valve, the improved arrangement for operating the gland follower, and other advantageous features described in the foregoing, it will be understood that I do not intend that the use of the above structure be limited to the details of the disclosure submitted except as defined by the scope and spirit of the appended claims.

I referred to illium as the preferred alloy or metal for resisting corrosion. However, it is to be understood that I do not intend to be limited to this particular metal. I propose to use such a metal as may be called for by the character of the fluid to be handled or to use a suitable material which is adapted to withstand the corrosive and erosive effects of a maximum range of chemical applications.

The aim of this invention it will be recalled is to produce a valve of one design and one construction regarding the detail parts and also the material from which these parts are made so that the valve can be used in a great variety of applications. The functional advantages of a valve which can be used for a large range of chemical applications is obvious. The structural advantages of the invention will be readily understood when it is considered that the same parts may be used for a throttling valve as I have described previously or for a check valve such for example as is shown in Figure 6.

Referring now to Figure 6, this figure shows a check valve employing a main casing designated by the numeral 1'. This main casing, it will be seen, is in all details the same as the one previously described in connection with the throttling valve. The ring seat 9' which abuts against the gasket 11' is also of the same construction. The chamber 6' of this check valve shown in Figure 6 has again the usual access opening which may be closed by means of the cover 8' equipped with fingers or arms 14' for holding the valve seat 9' in position. The attachment of the cover 8' is effected by means of the yoke 15' and the screw 19' which engages the socket 20' on the cover. The arms 16' of the clamp may engage sockets provided on the sides of the valve body 1'. An opening is provided in the valve body for machining the bore which is provided for receiving the valve seat 9' and this opening is closed by means of the plug 80 which is held in position by means of the nut 81. The latter may be of the same construction as the nut 34 employed in connection with the throttling valve. The flange of the plug 80 abuts against a suitable gasket interposed between this flange and the valve body inside of the chamber 6'. The plug member 82 is hinged to the seat 9' by means of the arm 83 which is pivotally mounted on the seat 9' as shown. The removal of the cover plate 8' therefore permits inspection, and also removal and replacement of both seat and plug as a single unit.

It will be seen from the foregoing descriptions of the throttling valve and of the check valve that my invention presents an article which can be used advantageously in a wide field. I have described specific embodiments of my invention in order to illustrate the structure and its use. In the following claims I have defined what I believe is new and distinguishing in the art.

I claim:

1. In a valve, a casing, a valve stem, a yoke fixed to said casing, a stuffing box having a gland disposed about said stem, a follower on said stem, and including arms engaging screw members for forcing said follower toward said casing to actuate said gland, said screw members projecting through said yoke, nuts for said screw members, and sockets in said yoke for receiving said nuts.

2. In combination, a yoke member having a pair of sockets, a pair of bolts projecting through said yoke substantially centrally of said sockets, a stem extending axially of said yoke, said bolts lying substantially parallel to said stem, a stuffing box and gland therefor on said stem, a follower for engaging said gland and comprising arms extending transversely to said stem, sockets in the opposite ends of said arms for receiving the tips of said bolts, and nuts threaded on the shanks of said bolts, said nuts being disposed in the sockets of said yoke member.

3. In a valve, a valve body, a stuffing box therefor, a stem projecting through said stuffing box into the interior of said valve body and having a rounded end, a valve plug, said valve plug having a central cavity for receiving the rounded end of said stem in loose engagement therewith, a laterally projecting washer secured adjacent the end of said stem within said cavity of said valve plug, and a member for securing the assembly of said valve plug with said stem with the end of said stem holding said washer disposed within said cavity of said valve plug.

4. In a valve, a valve body, a stuffing box therefor, a stem projecting through said stuffing box into the interior of said valve body, a valve plug, said valve plug having a central cavity for receiving the end of said stem, a laterally projecting washer secured adjacent the end of said stem, a member for enclosing the end of said stem with said washer within said cavity in said valve plug, a yoke having a hollow barrel in line with said stem, said stem projecting into said barrel, a hand wheel operatively mounted in said barrel, means for operatively joining said hand wheel with said stem within said barrel, and conjoint means for securing said stuffing box and said yoke on said valve body.

5. In a valve, a body, a stuffing box therefor, a stem projecting through said stuffing box into the interior of said valve body, a valve plug, said valve plug having a central cavity for receiving the end of said stem, a laterally projecting washer secured to the end of said stem, a member for enclosing the end of said stem with said washer within said cavity in said valve plug, a yoke having a hollow barrel in line with said stem, said stem projecting into said barrel, a hand wheel operatively mounted in said barrel, means for operatively joining said hand wheel with said stem within said barrel, and a single means for securing said stuffing box and said yoke in assembly with said valve body.

6. In a valve, a valve body, a stuffing box, a yoke having a hollow barrel, a stem projecting through said stuffing box with one end into the interior of said valve body and with the other end into the interior of said barrel, a valve plug secured to the end of said stem within said valve body, a hand wheel cooperating with the end of said stem within said barrel, and a single means for securing the assembly of said yoke and said stuffing box with said valve body.

7. In a valve, a valve housing, a yoke having a hollow barrel, a stuffing box having a threaded end projecting through at least a portion of said valve housing and said yoke, a nut attached to said threaded end of said stuffing box for securing its assembly with said yoke and said valve housing, a stem extending through said stuffing box, one end of said stem projecting into said valve housing, a washer secured to said end and extending laterally therefrom, a valve plug mounted on said end of said stem within said valve housing, the other end of said stem projecting into said barrel, and a hand wheel cooperating with said other end for moving said stem.

8. In a valve of the class described, a valve housing, a valve seat disposed in said housing, a stuffing box extending from said housing substantially in axial alignment with said valve seat, a yoke on said stuffing box, means for securing the assembly of said yoke and said stuffing box relative to said valve housing, said yoke having a hollow barrel substantially in axial alignment with said stuffing box, a stem extending through said stuffing box and projecting with one end into said valve housing and with the other end into said barrel, a valve plug comprising a plug member for cooperating with said valve seat and an auxiliary seat member for co-operation with said stuffing box, a collar on the end of said stem which is disposed within said valve housing for actuating said valve plug, a head on the other end of said stem disposed within said barrel, and a hand wheel mounted in said barrel for effecting axial displacement of said stem by means of said head thereon.

9. A valve of the class described, comprising a valve body, a valve seat thereon, an access opening in said valve body for gaining access to said valve seat, a cover for said opening, means on said cover for clamping said valve seat in place with said cover attached to the valve body around said opening, clamp means for exteriorly fastening said cover to seal said access opening, a stuffing box formed into a flanged bushing projecting from said valve body in substantially axial alignment with said valve seat, a gland for said stuffing box, a stem extending through said stuffing box and gland, a valve plug for said valve seat, a collar on the end of said stem within said valve plug, and an auxiliary member for mounting said valve plug on the end of said stem.

10. A valve of the class described, comprising a valve body, a valve seat therein, an access opening in said valve body for gaining access to said valve seat, a cover for said opening, means on said cover for clamping said valve seat in place with said cover attached to the valve body around said opening, clamp means for exteriorly fastening said cover to seal said access opening, a stuffing box formed into a flanged bushing projecting from said valve body in substantially axial alignment with said valve seat, a gland for said stuffing box, a stem extending through said stuffing box and gland, a valve plug for said valve seat, a collar on the end of said stem within said valve plug, an auxiliary member for mounting said valve plug on the end of said stem, a seat on said auxiliary member, and a seat on the flange of said stuffing box within said valve body for cooperating with said seat on said auxiliary member to seal the passage from said valve body through said stuffing box when said valve is operated to extreme open position, said cooperating seats being provided so as to permit repacking said stuffing box with said valve body under pressure.

11. A valve of the class described, comprising a valve body, a valve seat therein, an access opening in said valve body for gaining access to said valve seat, a cover for said opening, means on said cover for clamping said valve seat in place with said cover attached to the valve body around said opening, clamp means for exteriorly fastening said cover to seal said access opening, a stuffing box formed into a flanged bushing projecting from said valve body in substantially axial alignment with said valve seat, a gland for said stuffing box, a stem extending through said stuffing box and gland, a valve plug for said valve seat, a collar on the end of said stem which is within said valve body, an auxiliary member for mounting said valve plug on said end of the stem, a seat on said auxiliary member, a seat on the flange of said stuffing box within said valve body for cooperating with said seat on said auxiliary member to seal the passage from said valve body through said stuffing box when said valve is operated to extreme open position, said cooperating seats being provided so as to permit repacking said stuffing box with said valve body under pressure, a yoke having a tubular barrel for receiving the other end of said stem, and a single means for fastening said yoke and said stuffing box on said valve body.

12. A valve of the class described, comprising a valve body, a valve seat therein, an access opening in said valve body for gaining access to said valve seat, a cover for said opening, means on said cover for clamping said valve seat in place with said cover attached to the valve body around said opening, clamp means for exteriorly fastening said cover to seal said access opening, a stuffing box formed into a flanged bushing projecting from said valve body in substantially axial alignment with said valve seat, a gland for said stuffing box, a stem extending through said stuffing box and gland, a valve plug for said valve seat, a collar on the end of said stem which is within said valve body, an auxiliary member for mounting said valve plug on said end of the stem, a seat on said auxiliary member, a seat on the flange of said stuffing box within said valve body for cooperating with said seat on said auxiliary member to seal the passage from said valve body through said stuffing box when said valve is operated to extreme open position, said cooperating seats being provided so as to permit repacking said stuffing box with said valve body under pressure, a yoke having a tubular barrel for receiving the other end of said stem, and means mounted in said barrel and operatively connected with said other end of said stem for moving said stem to actuate said valve plug relative to said valve seat.

13. A valve of the class described, comprising a valve body, a valve seat therein, an access opening in said valve body for gaining access to said valve seat, a cover for said opening, means on said cover for clamping said valve seat in place with said cover attached to the valve body around said opening, clamp means for exteriorly fastening said cover to seal said access opening, a stuffing box formed into a flanged bushing projecting from said valve body in substantially axial alignment with said valve seat, a gland for said stuffing box, a stem extending through said stuffing box and gland, a valve plug for said valve seat, a collar on the end of said stem which is within said valve body, an auxiliary member for mounting said valve plug on said end of the stem, a seat on said auxiliary member, a seat on the flange of said stuffing box within said valve body for cooperating with said seat on said auxiliary member to seal the passage from said valve body through said stuffing box when said valve is operated to extreme open position, said cooperating seats being provided so as to permit repacking said stuffing box with said valve body under pressure, a yoke having a tubular barrel for receiving the other end of said stem, means mounted in said barrel and operatively connected with said other end of said stem for moving said stem to actuate said valve plug relative to said valve seat, a follower for operating said gland, a pair of screws loosely passing through said yoke and engaging said follower for operating the same, sockets in said yoke, a pair of nuts, one for each screw and engaging the threaded portion of said screw, said nuts being disposed in said sockets of said yoke and the heads of said screws projecting from said yoke.

14. A valve, comprising a body for receiving a valve seat and a self aligning plug therefor, an opening in said body disposed substantially in axial alignment with said valve seat, a flanged stuffing box disposed in said opening with the flange thereof in said valve body, a stem for operating said self aligning plug, said stem extending through said stuffing box, a yoke having a hollow member, means in said member for operating said stem, and a single means for mounting said yoke and said stuffing box on said valve body with said stuffing box extending through at least a portion of said yoke.

15. In a valve of the class described, a valve body for the passage of fluids under pressure, a valve in said body for controlling the flow of said fluids therethrough, a stem projecting from said valve body for operating said valve, a member containing packing for guiding said stem, a housing enclosing mechanism for actuating said stem, a single means for mounting said housing and said member on said valve body, and auxiliary cooperating seat members for closing the passage between said packing containing member and said stem for permitting repacking said member with the valve under pressure.

16. In a valve of the class described, a valve body for the passage of fluids under pressure, a valve in said body for controlling the flow of said fluids therethrough, a stem projecting from said valve body for operating said valve, a member containing packing for guiding said stem, a housing enclosing mechanism for actuating said stem, a single means for mounting said housing and said member on said valve body, auxiliary cooperating seat members for closing the passage between said packing containing member and said stem for permitting repacking said member with the valve under pressure, a gland on said stem between said housing and said member, a removable follower for actuating said gland, and screw means passing through said housing and projecting therefrom for operating said follower.

HARRY E. La BOUR.